US007383189B2

(12) United States Patent
Halonen et al.

(10) Patent No.: US 7,383,189 B2
(45) Date of Patent: Jun. 3, 2008

(54) METHOD AND DEVICE FOR PROVIDING SPEECH-ENABLED INPUT IN AN ELECTRONIC DEVICE HAVING A USER INTERFACE

(75) Inventors: Katriina Halonen, Vesilahti (FI); Henri Salminen, Ruutana (FI)

(73) Assignee: Nokia Corporation, Espoo (FI)

( * ) Notice: Subject to any disclaimer, the term of this patent is extended or adjusted under 35 U.S.C. 154(b) by 808 days.

(21) Appl. No.: 10/820,449

(22) Filed: Apr. 7, 2004

(65) Prior Publication Data

US 2005/0027538 A1    Feb. 3, 2005

(30) Foreign Application Priority Data

Apr. 7, 2003    (WO) .................. PCT/IB03/01262

(51) Int. Cl.
*G10L 21/06* (2006.01)
(52) U.S. Cl. .................................. 704/275; 379/88.01
(58) Field of Classification Search ................ 704/275; 379/88.01

See application file for complete search history.

(56) References Cited

U.S. PATENT DOCUMENTS

| 5,892,813 | A | * | 4/1999 | Morin et al. ............. 379/88.01 |
| 6,101,473 | A | | 8/2000 | Scott et al. |
| 6,188,985 | B1 | | 2/2001 | Thrift et al. |
| 6,212,408 | B1 | | 4/2001 | Son et al. |
| 6,374,226 | B1 | | 4/2002 | Hunt et al. |
| 6,532,447 | B1 | | 3/2003 | Christensson |
| 6,742,021 | B1 | * | 5/2004 | Halverson et al. .......... 709/218 |
| 7,003,457 | B2 | * | 2/2006 | Halonen et al. ............ 704/235 |
| 2001/0047263 | A1 | | 11/2001 | Smith et al. |

FOREIGN PATENT DOCUMENTS

DE    100 28 869 A1    1/2001

* cited by examiner

*Primary Examiner*—Susan McFadden
(74) *Attorney, Agent, or Firm*—Alfred A. Fressola; Ware, Fressola, Van Der Sluys & Adolphson LLP

(57) ABSTRACT

The present invention provides a method, a device and a system for multimodal interactions. The method according to the invention comprises the steps of activating a multimodal user interaction, providing at least one key input option and at least one voice input option, displaying the at least one key input option, checking if there is at least one condition affecting said voice input option, and providing voice input options and displaying indications of the provided voice input options according to the condition. The method is characterized by checking if at least one condition affecting the voice input is fulfilled and providing the at least one voice input option and displaying indications of the voice input options on the display, according to the condition.

15 Claims, 2 Drawing Sheets

METHOD AND DEVICE FOR PROVIDING SPEECH-ENABLED INPUT IN AN ELECTRONIC DEVICE HAVING A USER INTERFACE

CROSS REFERENCE TO RELATED APPLICATIONS

The present application claims priority under 35 USC §119 to International Patent Application No. PCT/IB03/01262 filed Apr. 7, 2003.

TECHNICAL FIELD

The present invention relates to multimodal interactive browsing on electronic devices and portable terminals and in communication networks. More specifically, the invention relates to a simple multi-modal user interface concept, by offering a close guidance of possible voice data-input and voice browsing as an entry alternative to use manual input. Moreover, the invention is related to checking the preliminary conditions that should be fulfilled for valid voice input.

BACKGROUND OF THE INVENTION

In multimodal applications, users can interact with other input modalities than only the keypad. For example, commands that are traditionally given by scrolling and clicking can be speech-enabled in the application so that the user can speak the commands, which will then be recognized by an automatic speech recognition engine. Adding speech interaction to visual applications receives growing interest as the enabling technologies are maturing, since in many mobile scenarios using the keypad is difficult, for example when driving or walking.

Until now different multimodal browsing architectures have already been proposed. For example the document U.S. Pat. No. 6,101,473 describes a method, where voice browsing is realized by synchronous operation of a telephone network service and an internet service. This is definitively prohibitive due to the waste of network resources, requiring two different communication links. Further this service requires an interconnection between the telephone service and the internet service. Another hurdle for user satisfaction is that the over-the-air co-browser synchronization required in a distributed browser architecture may cause latencies in browser operation which will degrade the user experience.

The document U.S. Pat. No. 6,188,985 describes a method in which a wireless control unit implements the voice browsing capabilities to a host computer. For this purpose, a number of multimodal browser architectures have been proposed where these operations are placed on a network server.

The patent U.S. Pat. No. 6,374,226 describes a system that is capable of changing the speech recognition grammar dynamically. For example, when an E-mail program goes to the composition mode, a new grammar set up is dynamically activated. This includes on one hand an improved use of device resources, but also includes the severe disadvantage that the device changes its "passive vocabulary." This may lead to frustrating experiences as the user who has learned that the device understands a certain expression may be faced with a device feigning deafness for its input when running another application.

The known systems suffer from the fact that users are not very keen to take the speech-enabled features into use.

Another problem arising from the state of the art is that users may not always be aware of the operation status of speech enabled browsing systems.

While there are standards being developed for how to write multimodal applications, there are no standards as to how the application interface should be built so that it would be as easy as possible for the user to become aware that speech input can be used.

Especially in devices and applications it would be desirable for a user to know which particular voice input is allowed at different times or under certain conditions.

When a user has put a speech recognition system successfully into use, it is probable that the user also continues to use it. In other words, there is a hurdle in starting to use speech control.

The problem has been solved earlier by audio prompts etc., but these become annoying very quickly, which degrades the usability experience.

Moreover, due to system load or the behavior of applications, all speech control options may not be available at all times, which is very difficult to convey to the user using prior art techniques.

All the above approaches for a multimodal browsing architecture have in common that they are not suitable for use in mobile electronic devices of terminals such as mobile phones, or handheld computers, due to low computing power, restricted resources or low battery capacity.

So it would be desirable to have a multimodal browsing system that is speech-enabled and provides superior user-friendliness.

SUMMARY OF THE INVENTION

According to a first aspect of the present invention, there is provided a method for multimodal interactive browsing, comprising the steps of activating a multimodal user interaction comprising at least one key input option and at least one voice input option, displaying the at least one key input option, checking if there is at least one condition affecting said voice input option, and providing voice input options and displaying indications of said provided voice input options according to said condition.

The activation of a multimodal user interaction in which at least one key input option and conditionally at least one voice input option is provided, can be provided by at least switching on the device or by activating a respective menu or respective settings.

In said multimodal browsing key input options are unconditionally provided and said at least one voice input option is conditionally provided. Said at least one voice input option is not provided, if at least one condition that could possibly interfere with voice input is fulfilled. The condition can be, e.g. ambient noise or a too low signal to noise ratio at the audio input. The condition can be, e.g. too low processing power, or battery status. The condition can e.g. be a too low voice transfer capability in case of a distributed speech input/recognition system. The condition can be restricted device resources. It should be noted that the conditions affecting the voice recognition feature can be caused by a combination of the above conditions.

The at least one key input option is displayed on a display of said electronic device or mobile terminal device, as in the case of conventional devices and conventional browsing.

The method is characterized by checking if at least one condition affecting the voice input is fulfilled and providing said at least one voice input option and displaying indications of said voice input options on said display, in case that none of said conditions is fulfilled. The checking can be performed e.g. every second, in faster intervals or continually. The checking can also be performed in an event controlled manner, wherein the check is only performed if an event is detected that is indicative of an impossible voice input.

If no such condition is fulfilled, the method can provide at least one voice input option and displaying indications of said at least one available voice input option on said display. It is also possible to display, if no such condition is fulfilled, the depiction or representation or indication that a voice input option is present and that a voice input can actually be performed. The first part describes the principle that a voice input can be made or is in the passive vocabulary of a voice recognition engine and the second part describes that voice recognition engine is active.

It is also possible to display a representation of the checked condition that is actually fulfilled and interferes with the voice input option. This can be embodied as e.g. a kind of icon or text indicating what kind of condition prevents the voice input and how it may be removed.

In multimodal applications where voice input can be given in addition to visual input (using keypad), the user must be made aware of when voice inputs are possible and also what is the allowed input. This method suggests a transparent way of letting the user know exactly when voice recognition is active and which voice commands are speech-enabled at any point.

Event mechanisms can also be used by the system to determine situations when speech recognition is not available for unexpected reasons or when the application designer has specified that a certain command or a command set is speech-enabled. All commands that are speech-enabled at a certain moment will be marked with a suitable visual method, for example coloring, to indicate to the user both the speaking moment and the allowed utterance.

The invention proposes to indicate dynamically by visual keywords or visual cues the elements that can be voice controlled depending on the availability of voice control for each item. For example, if the speech recognition engine cannot be used temporarily, or if only certain options are available at a certain point in an application, only those options are highlighted on the screen.

It can also be marked when speech input is temporally unavailable. It is also possible to mark only entries that are not speech enabled. This is some kind of an inverse approach that can be extended to some kind of switching between marking speech enabled straight and marking not speech enabled input options in dependence of the number of markings necessary. This can be implemented straight forward: green: enabled and black: not enabled and in an inverse notation red: not speech enabled input options and black: speech enabled input options.

This invention suggests visual keywords or cues to indicate to the user what can be spoken and also when the speech-enabling is on or off. When a visual command is speech-enabled, the command itself is marked e.g. with a different color or a respective icon than the commands that are not speech-enabled. When the speech-enabling is off, the color or a respective icon of the command changes dynamically back, and if speech-enabling is turned on again, the color or icon will change again. This marking will immediately indicate to the user what can be said and when. The method can be combined with an input prediction method to sort frequently used input option to the top of the list.

The reasons why the speech-enabling of a command might change while the user stays on the same screen can be, for example, the following:

System error: connection to the speech recognizer is cut off unexpectedly,

Change of environment: the device detects too much background noise for the recognition to work properly, System is currently doing some action during which it cannot listen at the same time because of system or application limitations, exhausted or exhaustively used system resources e.g. fetching data for the user, and Application designer's choice, described more closely in the following paragraph Different applications may choose different recognition grammars and vocabulary to enable speech in different manners, and the usage can vary even within one application. For example, if on one screen the user can do several different actions (each including 2-3 choices of a menu), the order of which does not matter, it is reasonable to allow the user to speak any of the options. On the next screen, there may again be several actions, but this time the order is not totally free. It is best to guide the user's speech input by making the order of actions explicit with the visual speech-enabling cue that is chosen, highlighting the actions at their proper time.

However, in a totally eyes-free situation; where voice is the only available modality, this invention cannot be used as the only cue to the user. Some auditory keywords would be required to indicate to the user when (and/or what) the user can speak. One way to indicate that a speech recognition is actually available can be implemented by a vibration alarm prompt. The vibration alarm prompt can comprise a single vibration as a start signal, and a short double vibration as a stop signal.

In an example embodiment said displayed indications of voice input options comprise keywords. The keywords can visualize available voice input or control options. The keywords can comprise any kind of cues or hints to the actual speech input that may be not displayable (such as whistling, humming or such sounds).

In another example embodiment said displaying of indications of said voice input options on said display further comprises displaying, if a speech recognition is actually possible. As already described above that is the recording or recognition state of a speech or voice recognition engine. This can be described as a "recording" or "recognizing" sign.

In another example embodiment of the present invention, said displaying of indications of voice input options comprises displaying said voice input options itself. That is, the input options are depicted as the verbatim of the words to be spoken for the voice input. The wording "input option" has been carefully chosen not to restrict the indication or the input option to any kind of specific form.

In another example embodiment of the present invention said displaying of indications of said voice input options on said display, is provided with a hysteresis. The use of a hysteretical behavior helps to avoid fast changes on the indication of the availability of said voice input options, in case that one of said checked conditions is near a threshold between inferring and not inferring said voice input feature. The hysteresis can be implemented in the checking or the program performing the check, or in the application performing the indication.

In another example embodiment of the present invention said displaying of indications of said voice input options on said display, is provided with a backlog function. As in the case of the hysteresis the backlog function can be used to determine and eliminate fast changing conditions that may cross a threshold value related to a condition (e.g. even overriding the hyteresis) to prevent the user from being confused by a rapidly changing voice input ability or voice input options. A backlog functionality can be implemented by a storage for storing the checking results of the last "n" seconds and a deactivation of a voice input option, as long as a single "over threshold value" entry is present in said back log file. As in the case of the hysteresis, the backlog function can be implemented in the display application or in the checking application. In both cases, the information conveyed to the user is made independent from small changes in the vicinity of a threshold and from fast changes.

According to yet another aspect of the invention, a software tool is provided comprising program code means for carrying out the method of the preceding description when said program product is run on a computer, a network device or a mobile terminal device.

According to another aspect of the present invention, a computer program product downloadable from a server for carrying out the method of the preceding description is provided, which comprises program code means for performing all of the steps of the preceding methods when said program is run on a computer, a network device or a mobile terminal device.

According to yet another aspect of the invention, a computer program product is provided comprising program code means stored on a computer readable medium for carrying out the methods of the preceding description, when said program product is run on a computer, a network device or a mobile terminal device.

According to another aspect of the present invention a computer data signal is provided. The computer data signal is embodied in a carrier wave and represents a program that makes the computer perform the steps of the method contained in the preceding description, when said computer program is run on a computer, a network device or a mobile terminal device.

The computer program and the computer program product may be distributed in different parts and devices of the network. The computer program and the computer product device run in different devices e.g. terminal device and remote speech recognition engine of the network. Therefore, the computer program and the computer program device have to be different in abilities and source code.

According to yet another aspect of the present invention a mobile terminal device for executing simulated communication is provided. The terminal device comprises a central processing unit, a display, a key based input system, a microphone and a data access means.

The central processing unit CPU is provided to execute and run applications on said mobile terminal. The display is connected to said CPU, to display visual content received from said CPU. The key based input system is connected to said CPU, to provide a key input feature that can provide key input options displayed on said display. The microphone is connected to said CPU, to provide a conditional voice input feature. The data access means is connected to said CPU, to handle data and to exchange data required for the operation of the CPU. In the simplest case the data access means is a storage and in more sophisticated embodiments the data access means can comprise e.g. a modem for a network access.

The CPU is configured to perform multimodal browsing via said display, said key based input system and said microphone. The CPU is configured to continually monitor conditions that interfere with said voice input and to provide said voice input feature, and display an indication of a voice input option of said voice input feature on said display, in case no such condition is fulfilled.

According to yet another aspect of the present invention a speech recognition system is provided that is capable of multimodal user interaction. The speech recognition system comprises at least one central processing unit, a display, a key-based input system, a microphone, and a data bus.

Said display is connected to said central processing unit to be controlled by said central processing unit (CPU). Said key-based input system is operably connected to said central processing unit, to provide a key input feature providing key input options that can be displayed on said display. The microphone is operably connected to said at least one CPU to provide a audio-electronic converter to make voice input accessible to said CPU. The data bus is operably connected to said at least one CPU, to handle data and to exchange data required for the operation of the said at least one CPU.

Said at least one CPU comprises a first central processing unit and a second processing unit. Said first processing unit of said at least one CPU is configured to control multimodal interaction via said display, said key based input system and said microphone. Said first processing unit is further configured to monitor conditions that affect said voice input and to control and display an indication of a voice input option of said voice input feature on said display according to said condition. Said second central processing unit of said at least one CPU is configured to provide said voice input feature.

In another example embodiment of the present invention the first central processing unit and the second central processing unit of the at least one CPU are comprised in the same device.

In yet another example embodiment of the system the first central processing unit and the second central processing unit of the at least one CPU are comprised in different interconnected devices. The interconnection can be provided by an audio telephone connection. The interconnection can be provided by a data connection such as GPRS (General Packet Radio Service), Internet, LAN (Local area network) and the like.

In another example embodiment said mobile electronic device further comprises a mobile telephone.

BRIEF DESCRIPTION OF THE DRAWINGS

In the following, the invention will be described in detail by referring to the enclosed drawings in which.

DETAILED DESCRIPTION

Figure 1:
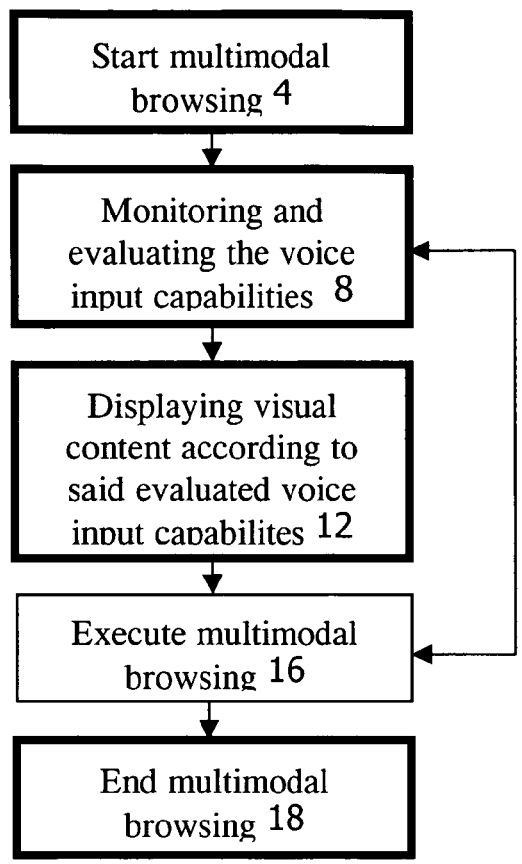
FIG. 1 is a flowchart of a method for dynamically indicating speech-enabling status to the user in multimodal mobile applications according to one aspect of the present invention.

FIG. 1 is a flowchart of a method for dynamically indicating speech-enabling status to the user in multimodal mobile applications according to one aspect of the present invention. The method starts with the activation of a multimodal browsing 4. The expression 'multimodal browsing' is used to describe the possibility to interact with the device in different modes, i.e. the device can put out different modes e.g. a visual mode or an audible mode. Multimodal browsing 5 can also include different input modes such as cursor or menu-keys and or alphanumerical keyboards, voice recognition or eye tracking. In the present figures a system with key and voice input capabilities is exemplary chosen to visualize the nature of the present invention. Following or simultaneously with the activation of the multimodal browsing, a monitoring or a surveying of the available input capabilities is started. The surveillance can be embodied by directly and repeatedly surveying the conditions that influence the speech recognition. The surveillance can also be embodied by a kind of indirect survey, by implementing sub algorithms at the respective application operating with a parameter that influences the speech recognition, and posts a signal or a message to the voice input application that a voice input is (probably) not possible. Such an approach can be described as an event based approach.

A possible condition is for example the actually available processing power. In case of a distributed voice input system a condition can be the connection properties such as bandwidth signal to noise ratio or the like. Another condition comprises the ambient or background noise which influences the speech recognition abilities.

From these example conditions it can be derived how probably a voice or speech input would be recognized. Therefore it can be derived, if the voice input feature is actually available or not. It should be noted that the ability to recognize certain voice inputs may vary from the condition. For example a background noise that comprises a sound signal that can be detected every second need not necessarily disturb the input of very short voice inputs, wherein voice inputs longer than a second can not be recognized because of the noise event.

In a next step a visual content is depicted 12 according to said monitored and evaluated input capabilities. That means that input options are depicted on a display of said electronic device or said mobile terminal device. Due to the usually restricted information content of a small mobile display, it should be clear that usually not all possible input options can be depicted on the display simultaneously. It should be noted that the unavailability of a voice input can also be depicted.

The user can simply perceive the available and possible speech inputs and can browse the elements depicted on the display by using either speech input or key input 16. When performing multimodal browsing a new display content can be called and depicted, wherein the new content is also provided with speech input keywords or cues and the like which are dynamically generated by surveying and evaluating the multimodal browsing conditions (i.e. speech input/eye tracking/recognition conditions).

The method ends with the deactivation of the multimodal browsing 18. With the end of the multimodal browsing, the surveillance of the multimodal input conditions can also be stopped or interrupted. A direct connection between the boxes 8 or 12 to 18 has been economized, as the termination of the multimodal browsing is performed by a user input. In case of an automatic shutdown (e.g. a low battery power shutdown), the device can directly jump from 8 or 12 to 18.

As usability tests have indicated, the learning curve of users in using speech is steep in that users adopt the speech interaction rather quickly and fluently after the first successful attempts. However, there is a high threshold to overcome before the learning can start. In other words, users do not usually realize that speech input is available unless explicitly told so. Moreover, it takes time and courage for them to try the speech command if they are not sure about what they can say. After trial and success many start to even favor the speech input modality when making routine selections. After trial and error it may happen that users simply ignore any speech input ability.

The tasks where speech can be used in visual applications can be divided into two categories:
1) speech-enabling existing visual commands (selecting links, radio buttons, etc.)
2) allowing actions for which there is no visual equivalent (e.g. shortcuts=utterances combining several commands allowing the user to bypass hierarchical selections, or allowing the user to enter text, as in dictation)

This invention focuses mainly on category 1, indicating to the user what is speech-enabled and when at different points in the application. In category 2 type tasks, this invention allows indication to the user when speech input is possible, by selecting the implementation suitably, but what exactly can be said in these tasks is out of the scope of this invention, except in case of a combination with a speech input prediction system wherein the borders between both categories become blurred.

To lower the threshold to use voice input and multimodal browsing, a small demo version embodied in the electronic device or terminal can be embodied as some kind of a language lab, wherein the phone demonstrates in a replayed dialogue a typical input scenario with pre-recorded speech inputs and input actions. For example: "To select the actual Battery status say 'say Fuelstate' repeat: . . . . . . . . . . and the requested information is read out loud 'Battery power at 25%'", "To select the actual Battery status say 'show Fuelstate' and the requested information is depicted on the display", wherein both actions can be accompanied the respective output.

In combination with a basic cursor based voice navigation system and speech recognizable words like "right", "left", "up", "down", "click", "doubleclick", "clickclick", "hold", "delete" and "select" a voice access can be provided even to voice-unable menu structures. The indication of a voice enabled speech navigation system can be provided by a mouth icon surrounded by the respective action icons or a mouth shaped cursor. In case of the selection of a gaming application by browsing via a menu (say "upupupupupclick" or "game") the possible speech input features are highlighted by a teeth/mouth icon or a snake icon to, select the game "snake" (say "downdownclick" or "snake").

Figure 2:
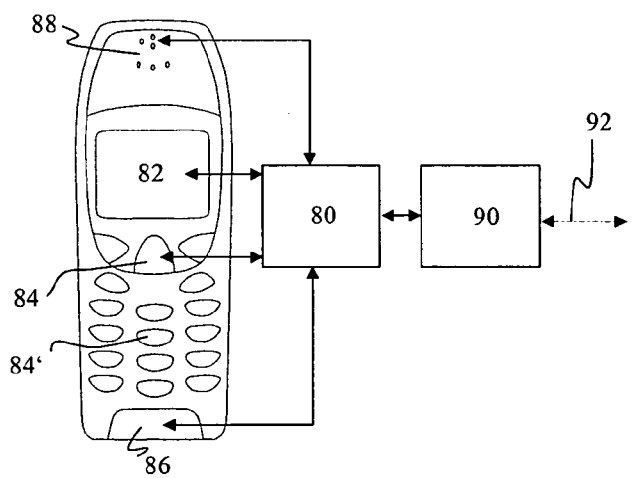
FIG. 2 is an example of an electronic device being capable of dynamically indicating speech-enabling status to the user for multimodal browsing.

FIG. 2 is an example of a electronic device or a terminal being capable of dynamically indicating speech-enabling status to the user for multimodal browsing. The device is depicted with a user interface as it is known from a mobile telephone. The mobile device is capable of executing multimodal interactive browsing, and comprises a user interface with input and output means such as the display 82 the keys 84 and 84', a microphone 86 and a loudspeaker 88. The user interface can be used for multimodal browsing comprising audio and key input and audio and display output. All the elements of the user interface are reconnected to a central processing unit CPU 80 to control the interaction of the user and the device.

The central processing unit is also connected to a data access means 90, to handle data and to exchange data required for the operation of the CPU 80 or applications running on said CPU 80. The CPU 80 is configured to perform multimodal browsing via said display (82), said key based input system 84, 84' and said microphone 86, and may be over said loudspeaker 88. The availability or operability of the multimodal browsing is dependent of parameters or on determined conditions. The CPU 80 can provide a multimodal browsing capability e.g. by running voice recognition applications on the device.

The CPU 80 is further connected to a data access means to access data stored in a built in storage (not shown) or access data via e.g. a network connection 92, to provide said multimodal browsing feature.

Said CPU 80 is further configured to monitor said conditions to continually determine the availability of said voice input feature. The monitoring can be applied e.g. every second in shorter intervals or continuously, in dependence of the kind of parameters or the conditions that are monitored or surveyed.

The determined availability of the voice input feature is then visually indicated on a display on basis of said determined availability.

In the case that the multimodal browsing is constant, independent from any external or internal restrictions, the present invention can not be applied in a meaningful way, as if there are no changing parameters effecting the multimodal browsing, it is useless to monitor these parameters, as changes in vocabulary or the voice input capability can not occur.

Figure 3:
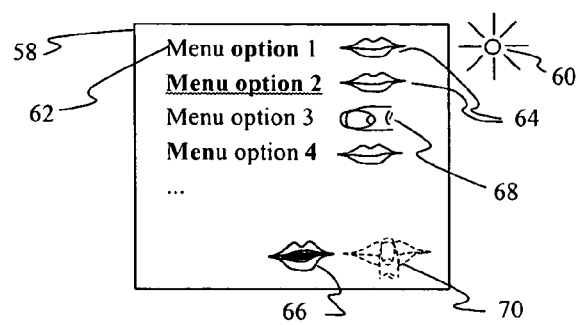
FIG. 3 is an example of a display comprising different indications of visual input options and their actual possible input state.

FIG. 3 is an example of a display comprising different indications of visual input options and their actual possible input state. There is depicted a display 58 of a mobile device that is multimodal browsing enabled. On the right side of the display 58 a light emitting diode LED 60 is placed. The LED can be used to indicate that a voice recognition engine or module is actually active or in a reception mode. The glowing flashing or blinking LED 60 can indicate that the user can talk to perform a user input or a user selection.

On the display there is depicted a usual list of selectable menu points "Menu option 1-4" 62.

Related to each of the menu options 62 there is depicted an icon 64, 68 indicating the possible input modes. The "Menu options 1, 2 and 4" are provided with a mouth icon to indicate that these input options are "voice inputable". The "Menu option 3" is provided with a finger icon to indicate that the only available input option for this menu option is pressing a key.

The "Menu option 2" is underlined to indicate that a cursor is actually selectable by pressing an "OK"-Button or by a voice input such as "OK", "click", "doubleclick", "clickclick" or "select".

The "Menu option 2" is depicted in bold letters to indicate that the "Menu option 2" is selectable by voice inputting the words "Menu option 2". The word "option" of the "Menu option 1" is depicted in bold letters to indicate that the "Menu option 1" is selectable by voice inputting the words "option". The syllable "men" and the number "4" of the "Menu option 4" are depicted in bold characters to indicate that the "Menu option 4" is selectable by voice inputting the words "Men four", or a wording based on this abbreviation.

The icons 66, 70 on the bottom of the display 58 can also be used to indicate that a voice recognition engine or module is actually active or in or not in a reception mode. The icon 66, an open mouth, can indicate that the user can talk to perform a user input or a user selection. The icons 70, closed lips sealed with a fingertip can indicate that the voice input option is actually not available.

The icons 66 and 70 and 64 and 68 can complement each other or exclude each other, as they provide redundant information.

Additionally to the icons, the following means can be used to denote when the user can speak:
- Spoken prompts can be played to the user, asking to speak an utterance ("Please choose/say a category.")
- Playing an earcon (auditory icon, e.g. a beep) either alone or at the end of a prompt to indicate that the user can start speaking
- The user can be allowed to control the speaking moment by clicking a special button to activate recognition (so called push-to-talk or "PTT" button)

In order to indicate what the user can say, the following means can additionally be used:
- Command lists are spoken to the user in the prompt ("Say 'Next', 'Previous', 'Back', 'Exit', or 'Help'")
- The prompt is designed to give implicit guidance to the user ("Do you want to go to Next or Previous?")
- The prompt gives an example about what can be said ("Select a day and a time, for example 'Monday at three'")

A spoken prompt is useful especially at the beginning of a session to remind the user about speech interaction. However, since the human beings can catch the content of a small mobile screen visually faster than it takes to listen to a sentence, prompts easily tend to sound long and tedious. Although barge-in (user interrupts the system prompt by speaking) is usually allowed in well-developed speech applications, users may be uncomfortable with speaking before the system has stopped, since it is considered impolite in human-to-human conversations. A more serious problem with spoken prompts is that the information in them is usually lost beyond recovery if the user is not concentrating. Also, long command lists are not useful, since they increase the user's memory load and boredom, since nearly every computer generated monologue lasting longer than 7 words or 3 seconds can readily be perceived as boring or annoying.

To summarize, while prompts are useful in making the situation more dialogue-like, they tend to be too long and available only for a short time. Auditory icons are short but they are also temporary signals. Visual cues for speaking that would stay visible on the screen to indicate when speech is allowed, when it is not, and what exactly can be said, would be an easy and transparent way to indicate speech-enabling to the user. Indicating when speech is allowed is also an easy way to make users aware of the barge-in feature and encourage them to interrupt or "vocally override" possible prompts.

Push-to-talk buttons, while allowing the user more control of the interaction, are not fully without problems, either. The device has to have a separate button for voice activation, or the user must be separately taught that a button serves as a push-to-talk button in some contexts. In some mobile contexts, pressing even one button might be cumbersome e.g. while riding on a motorbike on the pillion.

Figure 4A:
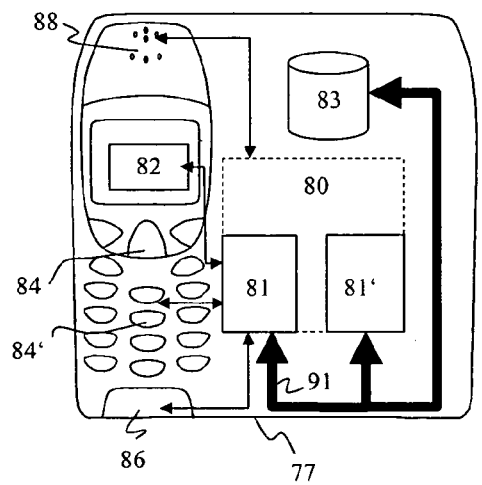
FIGS. 4A and 4B are examples of a distributed speech recognition system being capable of dynamically indicating speech-enabling status to the user for multimodal browsing.
Figure 4B:
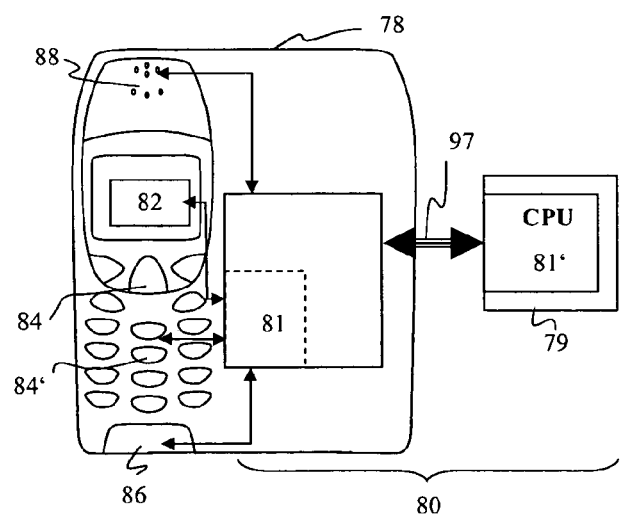

FIGS. 4A and 4B are examples of a distributed speech recognition system being capable of dynamically indicating speech-enabling status to the user for multimodal browsing.

FIG. 4A is an example of a distributed speech recognition system being capable of dynamically indicating speech-enabling status to the user for multimodal browsing, wherein said distributed speech recognition system is integrated in a single device 77. The term "distributed speech recognition" is used to indicate that the multimodal browsing and the speech recognition is executed at least in different processing units of said single device 77.

The mobile device 77 comprises a speech recognition system that is capable of executing multimodal interactive browsing, and comprises a user interface with input and output means such as the display 82 the keys 84 and 84', a microphone 86 and a loudspeaker 88. The user interface can be used for multimodal browsing comprising audio and key input and audio and display output. All the elements of the user interface are reconnected to a central processing unit CPU 80 to control the interaction of the user and the device.

The speech recognition system comprises at least one central processing unit 80, a display 82, a key-based input system 84, 84', a microphone 86, and a data bus 91. Said display is connected to said central processing unit to be controlled by said CPU 80. Said key-based input system 84, 84' is operably connected to said central processing unit 80, to provide a key input feature providing key input options that can be displayed on said display 82.

The microphone 86 is operably connected to said at least one CPU 80 to provide a audio-electronic converter to make voice input accessible to said CPU 80. The data bus 91 is operably connected to said at least one CPU 80, to handle data and to exchange data required for the operation of the said at least one CPU 80. The data bus 91 is operably connecting said at least one CPU 80 to an internal memory 83 to provide a data access to stored data necessary to provide said key input feature and/or said voice input feature. The internal memory 83 can store the different conditions and combinations of conditions of the device in which the voice input feature is accessible or not.

Said at least one CPU 80 comprises a first central processing unit 81 and a second processing unit 81'. Said first processing unit 81 of said at least one CPU 80 is configured to control multimodal interaction via said display 82, said key based input system 84, 84' and said microphone 86. Said first processing unit 81 is further configured to monitor conditions that affect said voice input and to control and display an indication of a voice input option of said voice input feature on said display 82 according to said monitored condition.

FIG. 4B is an example of a distributed speech recognition system being capable of dynamically indicating speech-enabling status to the user for multimodal browsing that is distributed between at least two devices. A distributed voice recognition can comprise the advantages that the resources required for speech recognition can be economized in the small and e.g. portable device 78.

To provide a distributed system, the CPU 80 has to be distributed between the two devices. The first central processing unit 81 and the second central processing unit 81' of the at least one CPU 80 are comprised in different interconnected devices 78 and 79. The interconnection between 97 the two devices (and of cause the first central processing unit 81 and the second central processing unit 81') can be provided by, e.g., a telephone connection. The interconnection can also be provided by a data connection such as GPRS (General Packet Radio Service), Internet, LAN (Local Area Network) and the like.

Said first central processing unit 81 alone can be configured to monitor said conditions to continually determine the availability of said voice input feature. The monitoring can be applied e.g. every second, in shorter intervals or continuously, in dependence of the kind of parameters or the conditions that are monitored or surveyed.

The major advantage of the invention is that it can be applied to any kind of mobile electronic devices regardless of the used features. A user using an electronic device always under the best voice control or multimodal browsing conditions will not recognize the presence of the present invention. The present invention can be applied to any kind of voice control or voice input used in technical applications.

There is also a possibility to apply the present invention to a non mobile system with no limitations in regard of resources. in a non mobile system the present invention can be used to indicate the words that can be recognized with a probability of nearly 100% and words that can be recognized only with a lower recognition rate and therefore are not to be regarded as being available (or requiring more training).

The visual keyword or cue that is chosen to mark the speech-enabling could be a color scheme or some other method, such as underlining. Underlining might easily be confused with a hyperlink, however. Color would be a good choice, and color displays are becoming more and more general. Red is typically used to mark active recording in audio applications, so it might be a suitable choice to indicate that speech-enabling is on. Some traffic light scenario could also be adopted. Animated icons may help to visualize that a longer action e.g. a voice input is possible for a depicted element such as ant colons, an animated sound spectrum monitor, a talking mouth.

The color system must be learned as well, even if only two colors are used, one for speech-on and the other for speech-off indications. A small legend describing the color usage might be visible on the early screens of the application.

Instead of colors, the speech-enabled commands could be marked in some other way, e.g. drawing a small speech bubble around the command. The visual cue should be directly tied to the command, however, to make the enabling method as transparent to the user as possible.

Changing the visual cue dynamically while on the same page can be done with suitable event mechanism. In the same way as the browser can highlight visual symbols in an XHTML application when a suitable "onclick" or "onfocus" event is caught, new events can be defined for cases that call for change in the visual speech-enabling cue. When a multimodal mobile browser catches these events, it would then change the color or other chosen visual cue in corresponding GUI elements as required.

With speech-enabled tasks that have no visual equivalent, some traffic light scheme can be used to indicate when speech recognition is active or inactive. This is relatively easy to implement with events that affect the whole screen at a time. One such measure can be to wobble the display illumination, invert the depiction mode, or selectively animating the voice enabled menu points, or let small balls jump from syllable to syllable as known from "Karaoke" videos.

Additional features that can be combined with the present invention are e.g. input prediction, training dialogues, voice input proposals via text or speech output. Icon based menu structures for illiterate people, trainable speech input. Read out user manuals employing a "read out" and a "read in" key.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

What is claimed is:

1. A method for indicating speech-enabled input for multimodal interaction in an electronic device having a user interface, comprising:
   activating a multimodal user interaction feature of said user interface in which at least one key input option and at least one voice input option is provided,
   displaying the at least one key input option on a display of said electronic device,
   checking, if at least one condition that could possibly interfere with voice input is fulfilled, and
   providing said at least one voice input option and displaying indications of said voice input options on said display according to said condition.

2. The method according to claim 1, wherein said displayed indications of voice input options comprise keywords.

3. The method according to claim 2, wherein said displaying of indications of said voice input options on said display further comprises displaying if a speech recognition is actually possible.

4. The method according to claim 1, wherein said displaying of indications of voice input options comprises displaying said voice input options.

5. The method according to claim 1, wherein said displaying of indications of said voice input options on said display, is provided with a hysteresis so as to prevent said displaying of indication from making fast changes.

6. The method according to claim 1, wherein said displaying of indications of said voice input options on said display is provided with a backlog function.

7. A software tool comprising program code stored on a computer readable medium for carrying out the method of claim 1, when said software tool is run on a computer or network device.

8. A computer program product comprising program code stored on a computer readable medium for carrying out the method of claim 1, when said program product is run on a computer or network device.

9. A computer program product comprising program code, downloadable from a server and stored on a computer readable medium, for carrying out the method of claim 1, when said program product is run on a computer or network device.

10. An electronic device comprising:
    a central processing unit,
    a display connected to said central processing unit, to display visual content received from said central processing unit on said display,
    a key-based input system operably connected to said central processing unit, to provide a key input feature providing key input options displayed on said display,
    a microphone operably connected to said central processing unit, to provide a voice input feature, and
    a data bus, operably connected to said central processing unit, to handle data and to exchange data required for the operation of the central processing unit,
    wherein said central processing unit is configured to control multimodal interactive browsing via said display, said key based input system and said microphone, and
    wherein said central processing unit is configured to monitor conditions that could possibly interfere with said voice input, and to provide said voice input feature and display an indication of a voice input option of said voice input feature on said display according to said condition.

11. The electronic device according to claim 10, further comprising a mobile communication device.

12. A speech recognition system capable of multimodal interaction comprising:
    a user interface,
    at least one central processing unit,
    a display connected to said central processing unit,
    a key-based input system operably connected to said central processing unit, to provide a key input feature providing key input options displayed on said display,
    a microphone operably connected to said at least one central processing unit,
    a data bus, operably connected to said at least one central processing unit, to handle data and to exchange data required for the operation of the said at least one central processing unit,
    wherein a first central processing unit of said at least one central processing unit is configured to control multimodal interaction via said display, said key based input system and said microphone and to monitor conditions that could possibly interfere with said voice input and to control and display an indication of a voice input option of said voice input feature on said display according to said condition, and
    wherein a second central processing unit of said at least one central processing unit is configured to provide said voice input feature.

13. The system according to claim 12, wherein the first central processing unit and the second central processing unit are comprised in the same device.

14. The system according to claim 12, wherein the first central processing unit and the second central processing unit are comprised in different interconnected devices.

15. An electronic device comprising:
    means for processing,
    means, connected to said means for processing, for displaying visual content received from said means for processing,
    means, operably connected to said means for processing, for a key input feature providing key input options displayed on said means for displaying,
    means, operably connected to said means for processing, for providing a voice input feature, and
    means, operably connected to said means for processing, for handling data and to exchange data required for the operation of the means for processing,
    wherein said means for processing is configured for controlling multimodal interactive browsing via said means for displaying, said means for providing a key input feature and said means for providing a voice input, and
    wherein said means for processing is configured for monitoring conditions that could possibly interfere with said voice input, and for providing said voice input feature and for displaying an indication of a voice input option of said voice input feature on said means for displaying according to said condition.

* * * * *